Figure 1:
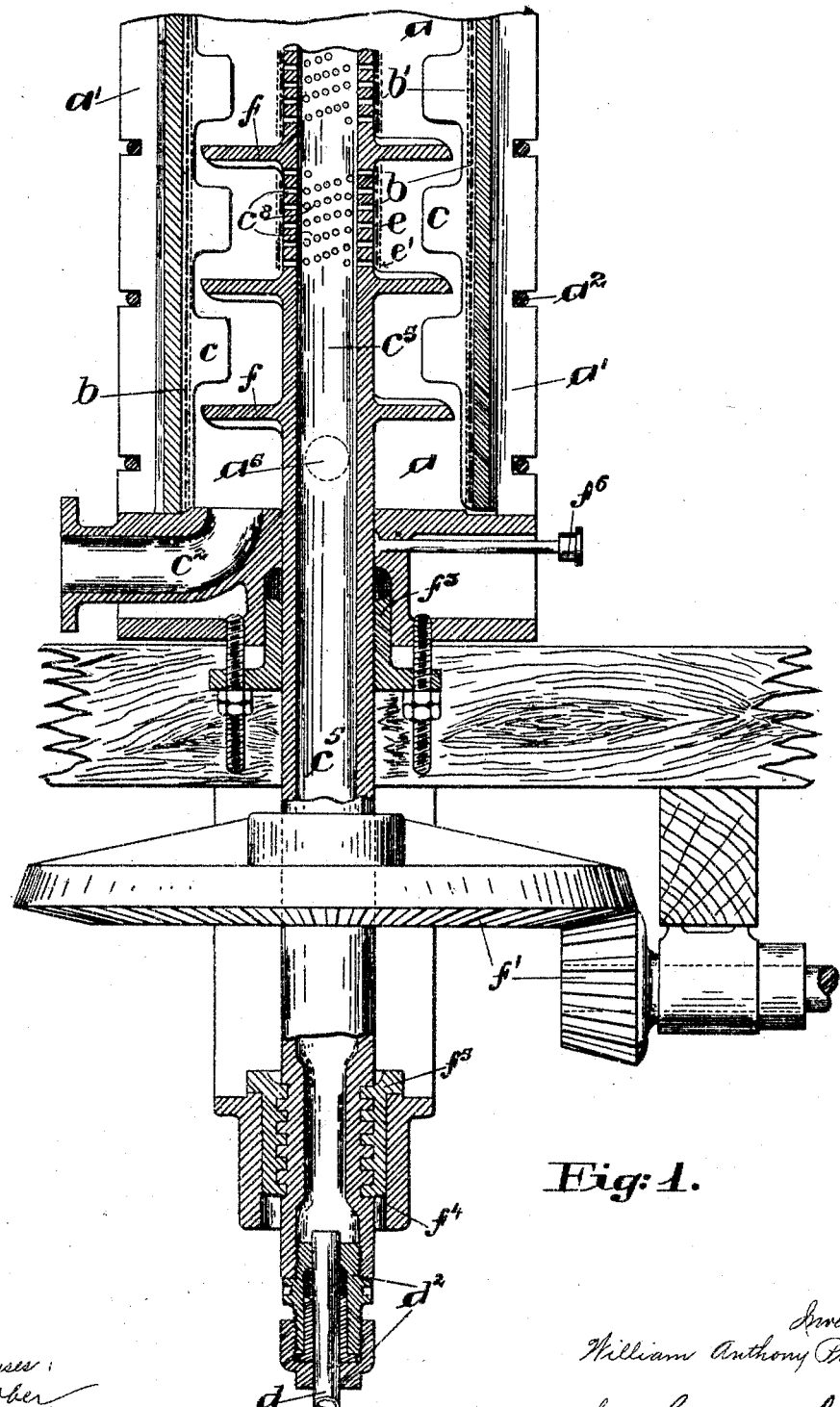

No. 776,084. PATENTED NOV. 29, 1904.
W. A. PRICHARD.
PRESSURE FILTER FOR SLIMES.
APPLICATION FILED JUNE 18, 1904.
NO MODEL. 2 SHEETS—SHEET 1.

Witnesses:
Inventor,
William Anthony Prichard.
by Henry Orth & Son,
attys.

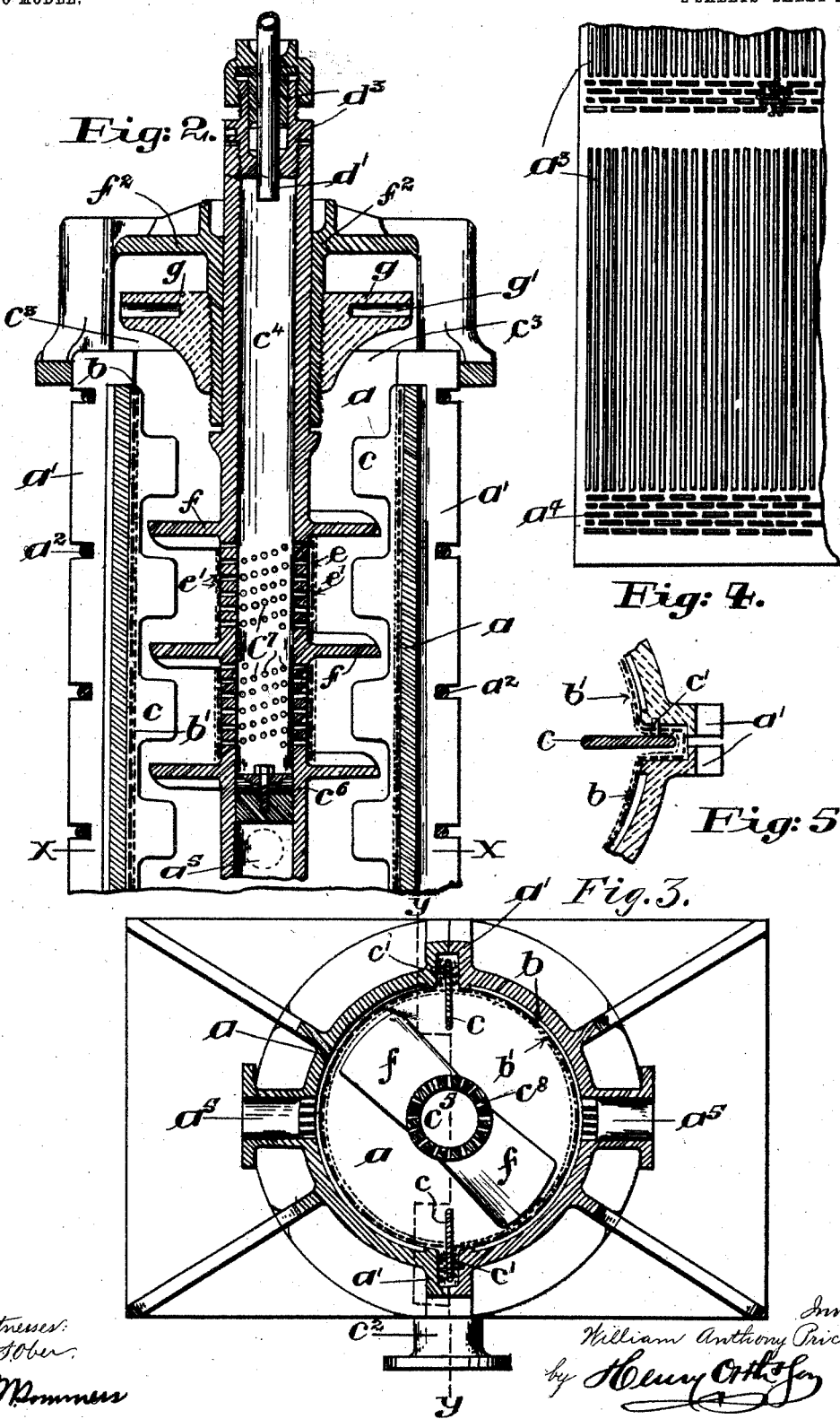

No. 776,084. Patented November 29, 1904.

UNITED STATES PATENT OFFICE.

WILLIAM ANTHONY PRICHARD, OF KALGOORLIE, WESTERN AUSTRALIA, AUSTRALIA.

PRESSURE-FILTER FOR SLIMES.

SPECIFICATION forming part of Letters Patent No. 776,084, dated November 29, 1904.

Application filed July 18, 1904. Serial No. 217,099. (No model.)

*To all whom it may concern:*

Be it known that I, WILLIAM ANTHONY PRICHARD, mining engineer, a subject of the King of Great Britain, and a resident of Kalgoorlie, Western Australia, Australia, have invented certain new and useful Improvements in an Improved Pressure-Filter for Slimes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This appliance has been designed for separating undissolved materials from its liquids by a treatment of pressure filtration characterized by forcing the mixture of liquids and solids into the appliance and subsequently driving the liquids through filtering mediums and effecting a separate discharge of the undissolved residual portions of the mixture. Means are also provided for treating the undissolved mass by forcing fluids through it as drying, washing, or dissolving agents, as may be found to be necessary.

The mixture as a whole is fed into the lowest end of the main chamber of the appliance and the liquids forced out through the filtering mediums, while the mixture during its process of exhaustion is concurrently conveyed upward by revolving propeller-blades and the undissolved residue being finally discharged at and from the top of the chamber.

The appliance for effecting this process of pressure filtration consists of an upright chamber of a cylindrical or conical form and whose internal wall is made to be of an uneven surface by ribbed or channeled formations which act as intervening passages for leading to the exits of the filtrate solutions. Said formations further act as supports for the filtering mediums and which latter may consist of cloths and metallic protector-screens.

The filter-chamber is provided with an internal hollow shaft arranged to be rotatable. This shaft is formed with orifices, and said shaft is divided into two compartments, into the lower one of which wash-water or other liquids or fluids under pressure is admitted, while preferably compressed air as a drying agent is fed into the upper compartment, so as to blow through the undissolved material and so carry out any liquids remaining therein and prior to its final discharge.

To clearly explain the construction of the invention, reference will be made to the attached drawings, illustrating same, and in which—

Figure 1 is a longitudinal section of the lower part of the machine, Fig. 2 being a similar view of the upper continuation of the appliance. Figs. 1 and 2 comprise the complete appliance; but in these drawings it is divided for sake of clearness. Fig. 3 is a transverse sectional view on line X X of Fig. 2. Figs. 4 and 5 are detail views showing the construction of the inner ribbed wall of the filter-chamber.

In the drawings, $a$ is the upright chamber, made in two pieces and having the flanges $a'$, which are secured by the bolts $a^2$. The inner wall of this chamber is formed or provided with vertical channels or ribs, as $a^3$, and with horizontal ribs $a^4$ and which ribs may be arranged in a replaceable manner. The object of these ribs is to form passages or intervening spaces between the filter-cloths and the wall of the chamber and so as to allow of the free escape of the solution into its exits $a^5$ and also to act as supports for such filter-cloths. As substitutes for these ribs it is obvious that a surface of an analogous construction may be employed as an agent for sustaining the filters and forming the collection-spaces. On and against this ribbed wall is placed the filtering medium $b$, which may be of cloth, matting, or porous textile material, and this cloth is provided with on inwardly-placed metallic protector-screen $b'$.

A vertical plate is arranged and placed longitudinally in the upright chamber $a$ and gripped or held between the flanges $a'$, above mentioned. This plate is formed with a series of extensions $c$, which proceed into the body of the chamber and act as baffle-plates for the undissolved material, so as to prevent it from rotating during its upward travel.

The filter-cloths $b$ and the metallic screens $b'$ and the baffle-plates $c$ are all clamped together by and between the flanges $a'$ and as clearly shown in Fig. 3, these baffle-plates being formed with projections, as $c'$, which fit into corresponding holes in the chamber $a$, and so hold such plates in true position while being clamped.

The wet mass is fed into the chamber through the pipe $c^2$ and finally discharged at the top mouth $c^3$ of the chamber. This chamber is provided with the central rotatable and hollow shaft, which is divided into the upper and lower compartments $c^4$ and $c^5$ by means of a movable and expansible plug $c^6$, said compartments being formed with the orifices $c^7$ and $c^8$, as shown, wash-water or other fluids or liquids under pressure being admitted by the pipe $d$ into the lower division $c^5$ and air or other fluid into the upper compartment $c^4$ by the pipe $d'$. These pipes are rendered fluid-tight by means of their joints and glands $d^2$ and $d^3$, and so prevent escape at their junctions with the rotatable shaft. The fluid is forced into the mixture through the orifices $c^7$ and $c^8$, as above mentioned. These orifices are covered with cloth, as $e$, which is again protected and held into position by the outer metallic screen, as $e'$.

The central hollow shaft is formed or provided with the axially-arranged propeller-blades, as $f$, which are set obliquely on their shaft and rotate between the baffle-plates, so causing the undissolved matter to be forced upward and discharged from the filter-chamber through the mouth $c^3$. Motion is imparted to this rotatable shaft by the bevel-gear $f'$ or otherwise, said shaft being held in the crown and intermediate bearings $f^2$ and $f^3$ and supported by the footstep-bearing $f^4$, which is further provided with the thrust-block $f^5$. These bearings are provided with suitable lubricators, as $f^6$.

At the topmost of the tubular shaft is placed the cone $g$, whereby the outlet for the undissolved matter is regulated. This cone is formed with an internal thread, and thereby works on the top bearing $f^2$ of the tubular shaft. This cone may be operated by a bar being placed in the openings $g'$.

The use of the appliance is mainly as follows: To start operations, the top cone $g$ is screwed down so as to close the opening $c^3$ and the mixture is forced under pressure through the feed-pipe $c^2$ and into the upright chamber $a$. Such pressure may be assisted by suction at the exits $a^5$, which results in the liquids being exhausted from the mixture and passed out through the filtering agents $b$ and $b'$, and then down along the ribs or passages $a^3$ and $a^4$, and finally out through the exits $a^5$. For the better and more effective leaching of the undissolved matter a washing liquid or fluid may be introduced by the pipe $d$ and into the lower part $c^5$ of the hollow internal shaft and then forced by its own pressure through the orifices $c^8$ and into the mass, so as to wash or otherwise treat the residual undissolved matter. This liquid or fluid is passed through the filtering mediums $b$ and $b'$ and out through filtrate-exits $a^5$. At the same time compressed air or other fluid may be for drying or treating purposes forced down from its pipe $d'$ and into the upper part $c^4$ of the hollow shaft and out through the orifices $c^7$ into the top section of the undissolved matter, and thence through the filtering mediums, and finally through the exits $a^5$. The cone $g$ is now raised, so opening the mouth $c^3$, and the central shaft is rotated by its operative gear $f'$, and by the blades $f$ the undissolved mass is conveyed up and through the chamber to its final discharge. These various operations of pressure filtration are now continued and run concurrently after they are first started in the manner described.

What I claim as my invention, and desire to secure by Letters Patent, is—

1. In a pressure-filter, the combination with a receiving-chamber having an inlet for the slime in its bottom, exits for the filtrate solutions, an outlet for the undissolved residue, and a filtering medium interposed between the slime-inlet and said exits, of baffle-blades longitudinally disposed in said cylinder, and a plurality of propeller-blades acting in conjunction with the baffle-blades, for the purpose specified.

2. In a pressure-filter for slimes, the combination of a receiving-chamber having an inlet for the slimes and exits for the filtrate solutions, a filtering medium interposed between said inlet and exits, means for injecting a washing medium into one part of the chamber and means for injecting a drying medium into another part of said chamber.

3. In a pressure-filter for slimes, the combination of a receiving-chamber having an inlet for the slimes and exits for the filtrate solutions, a filtering medium interposed between said inlet and exits, a hollow perforated shaft mounted in the chamber, means for injecting a washing medium, and means for injecting a drying medium into opposite ends of the shaft.

4. In a pressure-filter for slimes, the combination of a receiving-chamber having an inlet for the slimes and exits for the filtrate solutions, a filtering medium interposed between said inlet and exits, a hollow perforated shaft rotatable in the chamber, and having two separate compartments formed therein, means for injecting a washing medium into one compartment, and means for injecting a drying medium into the other compartment.

5. In a pressure-filter for slimes, the combination of a receiving-chamber open at one end and having an inlet for the slimes, and exits for the filtrate solutions, a filtering medium interposed between the inlet and exits, baffle-blades longitudinally disposed in said chamber, a rotatable shaft longitudinally mounted in the latter, and propeller-blades mounted on the shaft between the baffle-blades.

6. In a pressure-filter for slimes, the combination of a receiving-chamber having an inlet, and exits, a perforated rotatable shaft in the cylinder, a plug in the shaft dividing it into two compartments, means for injecting a washing medium into one end of the shaft and means for injecting a drying medium into the opposite end of said shaft.

7. In a pressure-filter for slimes, the combination of a vertical receiving-cylinder having a slime-supply inlet in its bottom, exits for the filtrate solutions in its wall, and an opening in its top for the undissolved residue, a filtering medium covering the wall, baffle-blades longitudinally disposed in said cylinder, a perforated rotatable shaft mounted in the latter and divided into two compartments, propeller-blades on the shaft between the baffle-blades, means for injecting a washing medium into the bottom compartment of the shaft, means for injecting a drying medium into its top compartment, and means for regulating the discharge of the undissolved residue.

8. A filtering-cylinder constructed of sections, each having side flanges adapted to be bolted together, a plurality of longitudinal parallel ribs, and a plurality of transversely-disposed ribs formed on the inner face of each section, in combination with a filtering medium adapted to lie against said ribs and extend between the flanges of said sections.

In testimony that I claim the foregoing as my invention I have signed my name in presence of two subscribing witnesses.

WILLIAM ANTHONY PRICHARD.

Witnesses:
FREDERICK JAMES KINDON,
FREDERICK CHARLES CURWOOD.